Feb. 22, 1927. 1,618,514
L. G. COPEMAN
DRINKING WATER SUPPLY FOR REFRIGERATORS
Filed Feb. 15, 1926 2 Sheets-Sheet 1

INVENTOR.
Lloyd G. Copeman
BY Stuart C. Barnes
ATTORNEY.

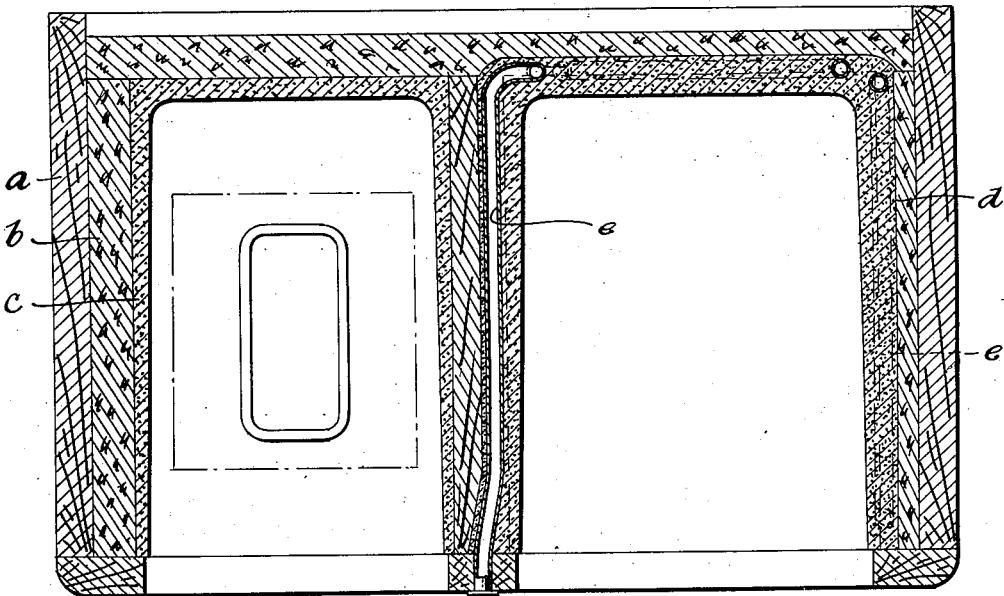
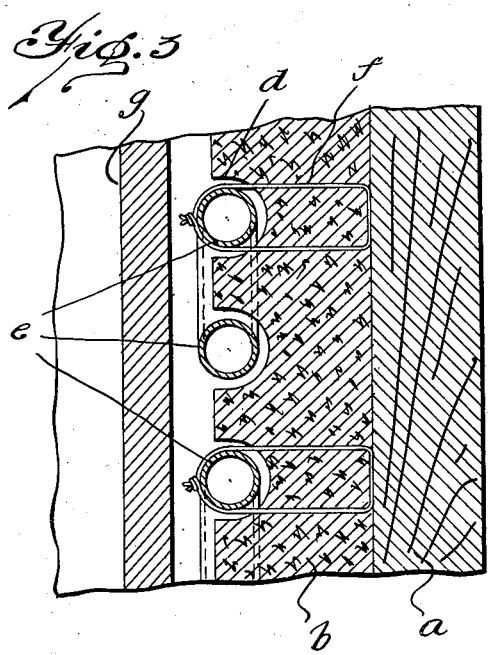
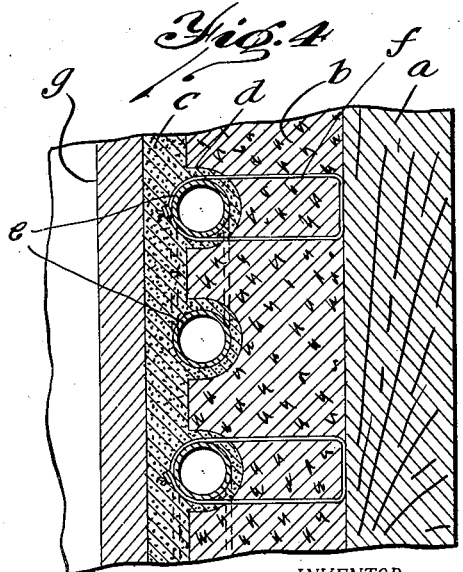

Patented Feb. 22, 1927.

1,618,514

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

DRINKING-WATER SUPPLY FOR REFRIGERATORS.

Application filed February 15, 1926. Serial No. 88,344.

This invention relates to power refrigeration and the cooling of drinking water.

Domestic refrigeration is fast coming into its own, but the problem of providing suitable drinking water is a serious one in these refrigerators on account of the relatively low temperatures at which they operate. Drinking water at very low temperatures, just about freezing, is very unpalatable. These domestic refrigerators are operated ordinarily at a temperature somewhere down around zero in the brine chamber and somewhere about freezing in the food chamber. The food chamber is always protected against freezing by reason of the setting of the thermostat sufficiently above a freezing temperature.

Where a water tank is set on a partition wall between the food chamber and what corresponds with the ice chamber, the water will get so cold that it will either freeze or else be so very low in temperature as to be practically undrinkable. When it is understood that the best well water runs somewhere around 40 and 50 degrees in temperature, it will be appreciated that water delivered from an iceless refrigerator down around the freezing point is not very serviceable for domestic consumption.

It is the object of the present invention to carry this service water line in such heat exchange relation with the interior as to cool the water but to keep it at a temperature which tends to approximate the temperature of well water and make the water very palatable to drink.

In the drawings:

Fig. 2 is a cross section on the line 2—2 of Fig. 1.

Fig. 3 is an enlarged section of the wall structure before the moulding operation.

Fig. 4 is an enlarged section after the moulding operation.

Figure 1:
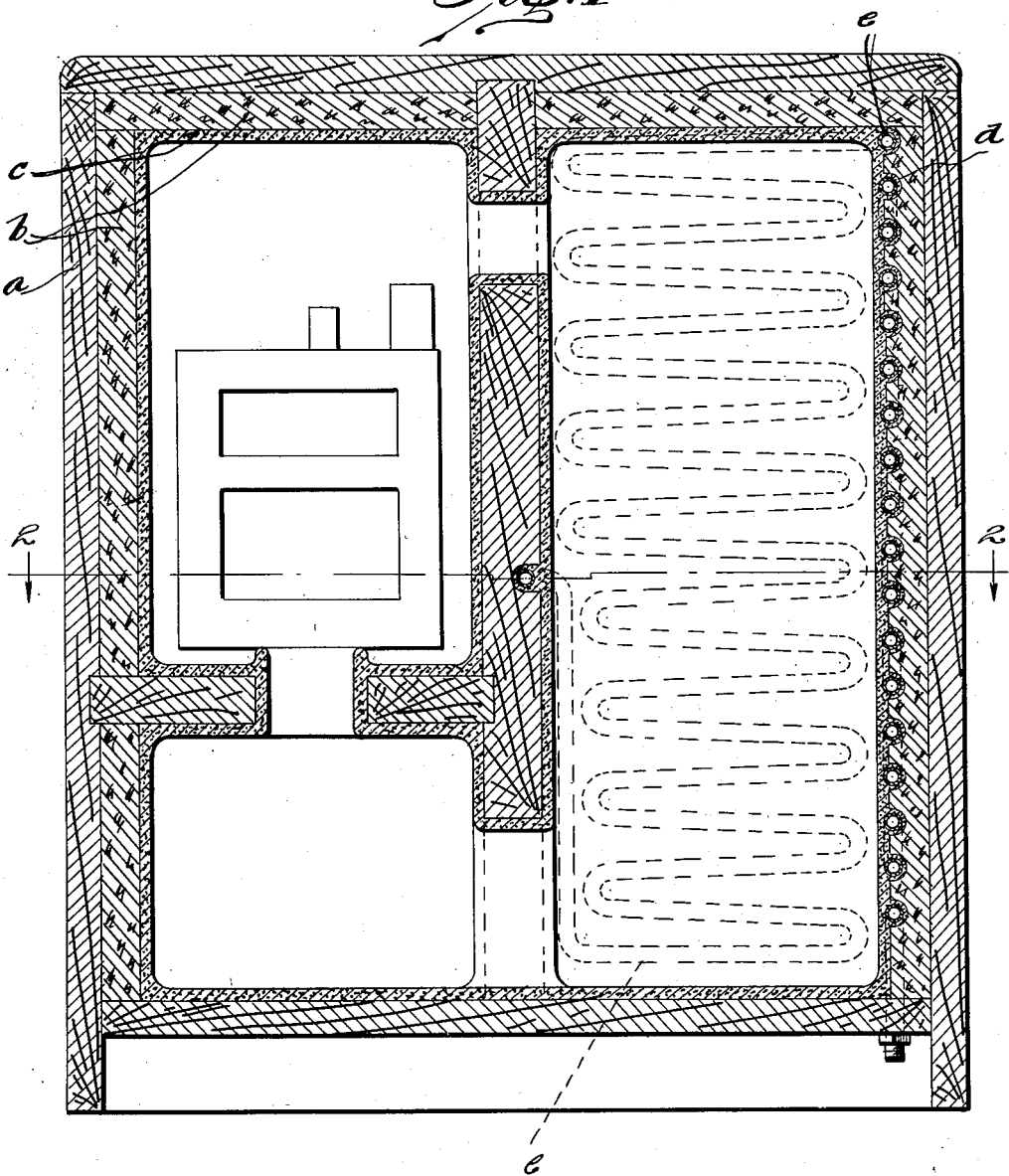
Fig. 1 is a vertical section of the refrigerator.

The refrigerator is preferably constructed of shallow wood $a$. This may be covered with Duco or a spray coat of oxy-chloride cement. Fitted on the inside of this shell is the thick corkboard $b$ and moulded or trowelled on the inside of the corkboard is the stone inner shell $c$. Preferably, I mould this on and use a stone composition material, such as oxy-chloride cement. This comprises a mixture of magnesium oxide, fine sand or ground flint, or both, to which is added sufficient magnesium chloride solution at 26° Baumé to make a composition of material that will easily pour. However, this may be varied within wide limits, especially where it is trowelled on, as in such a case very much less magnesium chloride is used.

In the corkboard which lines the side and back wall of the food chamber I cut across grooves $d$ which are joined by small connected grooves at the ends to receive the coils of pipe $e$. After these coils of pipe are laid in the grooves they are preferably tied in place by means of the cords $f$ which are inserted through small holes punched out before the corkboard is put in place. A core $g$ is then inserted in the mould, the mould being formed by the wooden exterior and the corkboards. This core may be of metal or may be stone core. The stone will then flow down into the space between the cork and the core, as is clearly shown in Fig. 4. It will be wondered how the stone gets in behind the pipe; the pipe is apparently floated in the stone. I find that measurably good results occur in centralizing the pipe or floating it in the stone by reason of vibrating the mould which I preferably do by means of a suitable vibrator, as described and claimed in my co-pending application, Serial No. 84514, filed Jan. 28, 1926.

At any rate this method of manufacture serves to get the water pipes on the back of the inside cock of the refrigerator with more or less of the stone covering the back of the pipes.

I find that by joining numerous convolutions of pipe to the back of two walls of the food chamber that with the refrigerator that has its food chamber kept at most desirable temperature, I get water that is cooled but which is properly moderated to the sensibilities of the palate.

What I claim is:

1. In a refrigerator, the combination of a stone interior lining defining chambers, including a food chamber, and a water service pipe supported to the outside of the food chamber in proximity with its lining so as to get a proper cooling and moderation of the water by heat exchange through the lining.

2. In a refrigerator, the combination of a cabinet, a stonework lining therefor, defining one or more chambers, including a food chamber and a water service pipe for drinking water embedded in the stonework lining.

3. In a refrigerator, the combination of a cabinet, including heat insulating material, and a lining defining one or more chambers including a food chamber, a power-operated heat abstracting unit in one of the chambers, and a water service pipe supported on the outside of the stone lining of the food chamber in recesses contained in the heat insulating material.

4. In a refrigerator, the combination of a cabinet divided into a plurality of chambers, a power-operated heat abstracting unit located in one chamber, a stone lining for the food chamber, and a water service pipe for drinking purposes supported in heat conducting relation with the stonework to the outside of the food chamber.

In testimony whereof I have affixed my signature.

LLOYD G. COPEMAN.